UNITED STATES PATENT OFFICE.

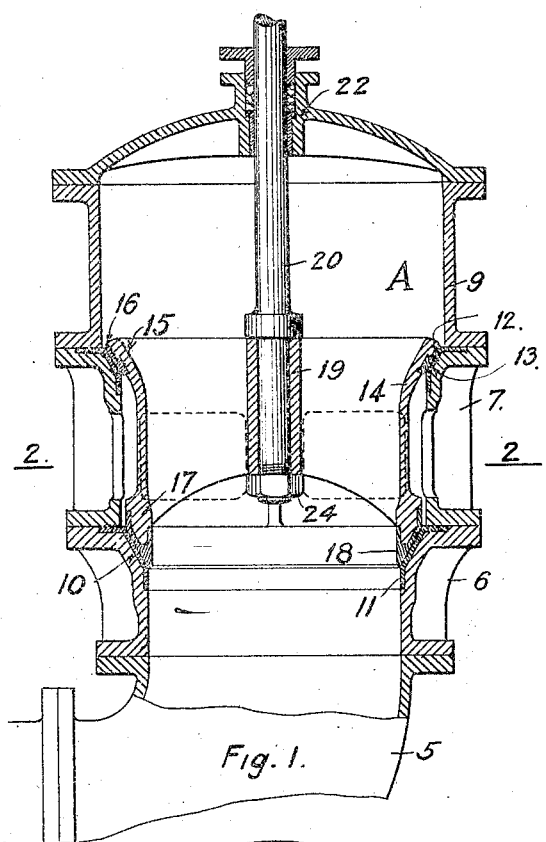
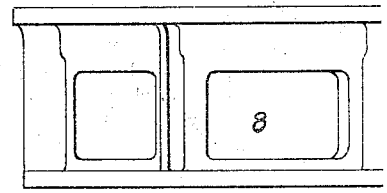
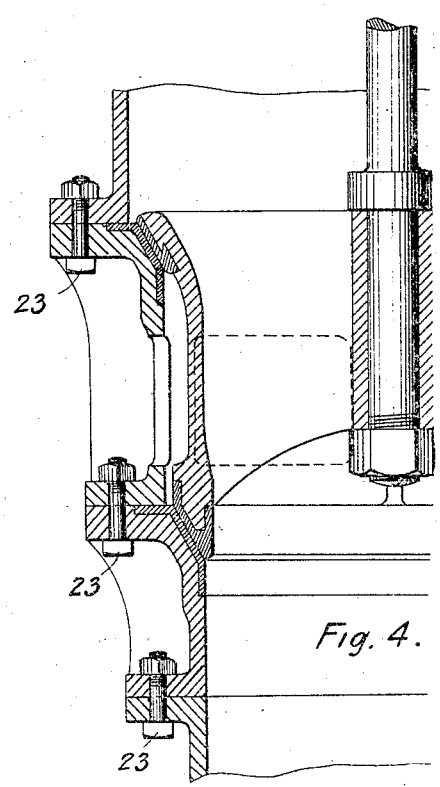
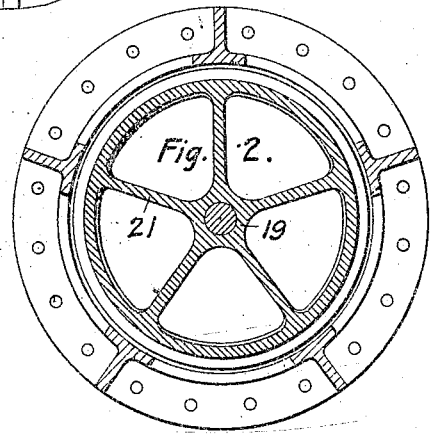

JOHN PETERSON, OF NEW YORK, N. Y.

VALVE.

No. 865,798.

Specification of Letters Patent.

Patented Sept. 10, 1907.

Application filed January 16, 1907. Serial No. 352,489.

*To all whom it may concern:*

Be it known that I, JOHN PETERSON, a citizen of the United States, and a resident of New York city, borough of Manhattan, in the county of New York and State of New York, have invented certain new and useful Improvements in Valves, of which the following is a specification.

The present invention relates to valves and has particular application to mechanism of the type referred to, designed particularly for use in connection with reservoir sluiceways and other places requiring large controlling valves, although I wish it to be understood that the invention is applicable for other purposes.

In carrying out the present invention I have in view the provision of a valve, the plug or gate of which is so constructed and arranged as to be balanced, thereby admitting of the easy operation of the structure.

The invention consists in the construction, combination and arrangement of parts set forth in and falling within the scope of the appended claims.

In the accompanying drawings like characters of reference indicate like parts in the various views, and Figure 1 is a view mainly in section showing my improvement applied to an elbow pipe; Fig. 2 is a transverse sectional view taken on the line 2—2 of Fig. 1; Fig. 3 is a view in side elevation of the valve plug; Fig. 4 is a sectional view, enlarged, of a portion of the valve plug and the casing, and showing the conical construction of the gasketed portions.

Referring now to the drawings in detail, 5 designates an elbow pipe surmounted by the valve casing A, such casing comprising the base portion 6, the intermediate open section 7, such section being open in the sense that it is provided with a plurality of ports 8 designed to permit the water to pass therethrough. The intermediate section is surmounted by the valve bonnet 9. The top edge portion of the base section 6 is flared or inclined, as at 10, and is surrounded on its interior face by the packing or gasket 11. The upper edge portion of the intermediate ported section 7 is similarly flared or inclined, as at 12, and is also provided with the packing or gasket 13. The valve plug is indicated at 14 and comprises an open or hollow body portion having its edges inclined, so that a conical plug results. The upper inclined edge 15 it surrounded by the annular gasket 16 while the lower inclined edge 17 is provided with a bearing 18. This plug is provided at its central portion with a socket 19 for the reception of the valve stem 20, such socket being connected to the annular portion of the plug by the web 21 which gives strength and rigidity to the plug. The stem 20 extends through the stuffing box 22 at the top of the bonnet.

From the above description taken in connection with the accompanying drawings, the construction and operation of my mechanism will be readily apparent. In the particular device shown the elbow or pipe is adapted to be submerged so that the water may flow at all times through the open ports 8. In its normal closed position the valve is as shown in Fig. 1, that is to say, with the conical peripheral edges of the plug bearing against the interior annular inclined edge portions 6 and 7. When the valve is opened by operating the stem 20 the conical plug is lifted upward from the position shown in Fig. 1, and the water flows into the pipe, and as pressure is applied to both ends of the valve, or upon both sides of the same, it is thus balanced in its action and may be operated with but little exertion and with facility. It is of course evident that this balancing effect is further attained by the fluid flowing into the bonnet portion of the structure, and in through the hollow plug. In Fig. 4 one manner of securing the intermediate section and the bonnet is shown, in such instances, ordinary bolts or screws 23 being employed. The valve stem 20 may also be secured in a sleeve or socket in any suitable manner, such as by the nut 24 threaded onto the end of such stem.

I am aware of the fact that hitherto it has been proposed to construct a valve having concentrically arranged seats adapted to form bearing surfaces for a conical plug. Such a construction is shown in the patent to Storle No. 784,081, but my device differs in both construction and function from a mechanism such as shown in this patent. For, instead of employing a diaphragm or partition extending obliquely across the valve chamber, and having the fluid flow directly from the pipe through the lower valve chamber and in through the outlet, I provide, as above described, a construction wherein one portion of the valve casing is at all times open, in the drawings this being shown as the intermediate section having the ports 8. I do not as in said patent have merely an opening on one side of the case, which opening is normally closed by the recessed cap, but I provide a hollow conical plug bearing against inclined seat members formed above and below an annular section of the casing, which section is open on all sides. By such a construction I am enabled to attain the desired end, the balance of a large structure of valve, which may be submerged permanently in a well or reservoir.

Having thus described my invention, what I claim as new and desire to secure by Letters Patent is:—

1. The combination with a pipe, of a valve casing surmounting the same adapted to be submerged in a body of water, said casing having ports arranged therein to permit the inflow of the water at all times, a plurality of seats concentrically arranged above and below the ports, and a hollow plug having inclined end portions adapted to bear against the seats.

2. A valve comprising a casing adapted to be submerged in a body of water and having an intermediate section formed with a plurality of ports at all times open to the inflow of water, valve seats arranged above and below the ports, and a conical hollow plug adapted to bear against said seats when closed.

3. The combination with a valve casing adapted to be submerged in a body of water and having a plurality of ports formed therein at all times open to the inflow of water, concentrically arranged inclined seats formed above and below said ports, a closed chamber above the uppermost seat, and a tubular conical plug arranged within said casing and adapted to have its upper and lower edge portions bear against adjacent seats when the valve is closed.

4. The combination with a casing, adapted to be submerged in a body of water and having an intermediate section formed with a plurality of ports extending entirely around the same and at all times permitting the inflow of water, inclined seats arranged above and below said ports, a tubular conical plug within said casing having inclined edge portions designed to bear against adjacent seat portions, and a stem for said plug extending through the bonnet portion of the valve.

5. The combination with a pipe, of a valve casing adapted to be submerged in a body of water, said casing including an upper bonnet portion and an intermediate portion having ports extending entirely around the same and open at all times for the inflow of water, concentric seats formed at the intermediate portion above and below the ports, and a tubular conical plug adapted to have its upper and lower edges bear against said seats.

In testimony whereof I have hereunto signed my name in the presence of the two subscribing witnesses.

JOHN PETERSON.

Witnesses:
R. B. CAVANAGH,
JOS. J. PIERANDO.